United States Patent [19]

Long

[11] Patent Number: 4,494,509
[45] Date of Patent: Jan. 22, 1985

[54] HIGH RESOLUTION ELECTRONIC IGNITION CONTROL SYSTEM

[75] Inventor: Alexander Long, Falls Church, Va.

[73] Assignee: Electromotive, Inc., Fairfax, Va.

[21] Appl. No.: 436,291

[22] Filed: Oct. 22, 1982

[51] Int. Cl.³ .................................................. F02P 5/08
[52] U.S. Cl. .................................... 123/416; 123/414; 123/418; 123/419; 123/422
[58] Field of Search ............... 123/414, 415, 416, 417, 123/418, 419, 421, 422

[56] References Cited

U.S. PATENT DOCUMENTS

| | | | |
|---|---|---|---|
| 4,175,506 | 11/1979 | Sakamoto et al. | 123/416 |
| 4,208,992 | 6/1980 | Polo | 123/416 |
| 4,249,493 | 2/1981 | Honig et al. | 123/416 |
| 4,292,943 | 10/1981 | Kyogoku et al. | 123/418 |
| 4,300,518 | 11/1981 | Petrie | 123/416 |

FOREIGN PATENT DOCUMENTS 0038375  3/1983  Japan ................................. 123/414

Primary Examiner—Parshotam S. Lall
Attorney, Agent, or Firm—Mason, Fenwick & Lawrence

[57] ABSTRACT

An electronic ignition system is disclosed for controlling as a function of a selected engine parameter the ignition instant of an internal combustion engine having at least one cylinder and a piston disposed therein and coupled to a rotatable crankshaft of the engine to define a first reference position with respect to the crankshaft. The ignition instant occurs upon the termination of an arc of crankshaft rotation at a second variable position with respect to the first reference position. The arc of crankshaft rotation is initiated at a third reference position fixedly disposed before said first reference position considering the rotational direction of the crankshaft. More specifically, the electronic ignition system comprises a first sensor responsive to crankshaft rotation for providing a first train of signals of a first frequency, each first signal occurring in time when the crankshaft rotates past its third reference position, and a second sensor responsive to crankshaft rotation for providing a second train of signals of a second frequency greater than the first frequency and proportional to the speed of angular rotation of the crankshaft. A counter is coupled to receive the first and second trains of signals and actuated upon the occurrence of each signal of the first train for integrating the second train of signals to obtain an indication of the present crankshaft position with respect to said first variable position. The present crankshaft position is used to determine the ignition instant.

47 Claims, 21 Drawing Figures

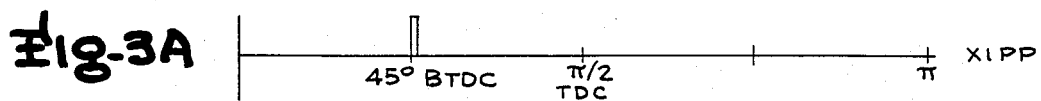
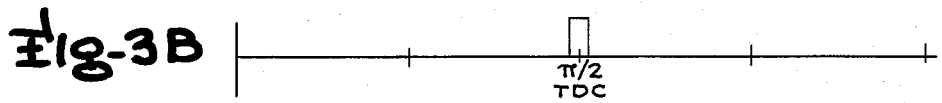
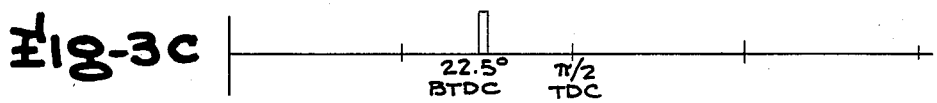
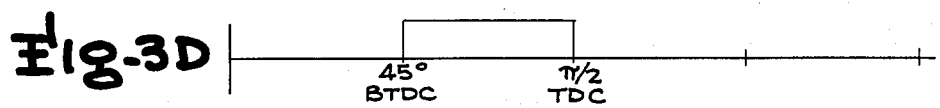
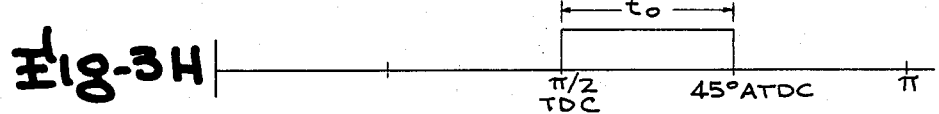
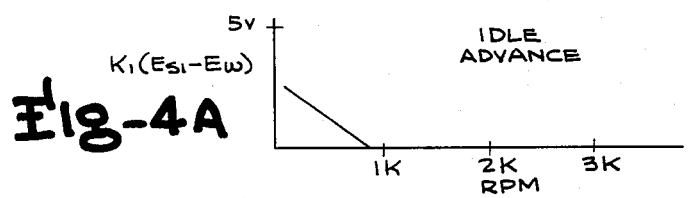
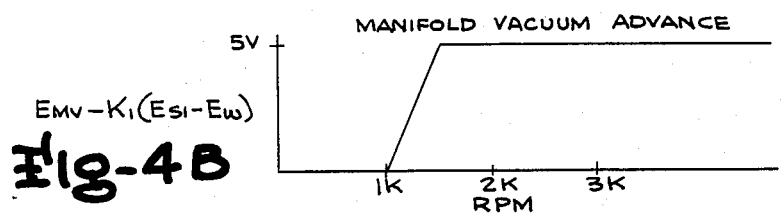
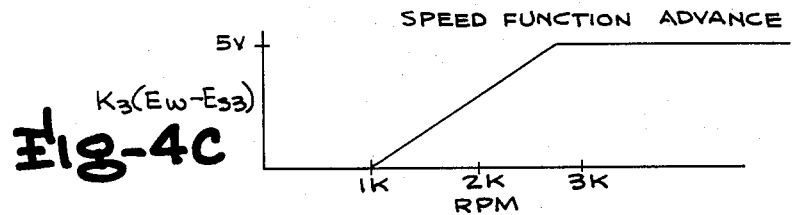

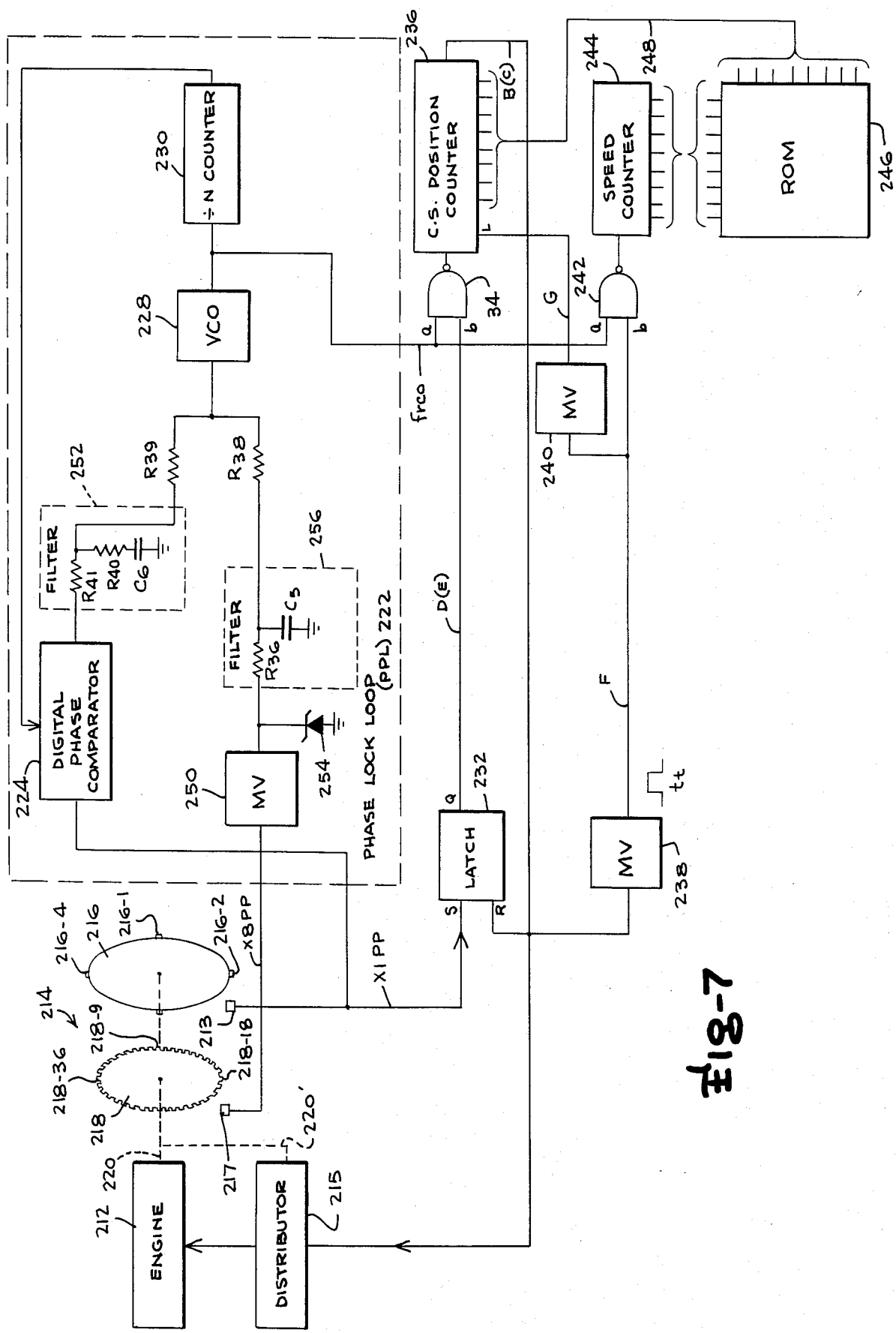

HIGH RESOLUTION ELECTRONIC IGNITION CONTROL SYSTEM

BACKGROUND OF THE INVENTION

1. Field of the Invention

The present invention relates generally to the field of internal combustion engine control systems and, in particular, to those closed loop control systems as are responsive to various engine operational parameters for controlling the ignition of internal combustion engines. In greater detail, the present invention is concerned with a closed loop ignition control system that is responsive to various parameters such as engine speed, crankshaft position, load as indicated by the manifold vacuum, and engine cylinder position.

2 Description of the Prior Art

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control techniques could be developed. This would reduce the number of variables needed to be detected, reduce the complexity of the control systems, and at the same time improve the overall efficiency.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15° after the piston's top dead center (TDC) position. The results of this investigation are published in a *Final Report No SUDAAR503* entitled "Closed Loop Control of Internal Combustion Engine Efficiency and Exhaust Emission". The report contains a block diagram of a closed loop system in which a sensor detects the angle at which peak pressure occurs and then compares this measured angle with the desired 15° angle. An error signal, generated when the measured angle differs from the desired angle, is used to correct the ignition timing signal generated, regardless of other sensed engine parameters.

J. Glaser and J. D. Powell describe in a subsequent report SAE 810058 their investigation of a closed loop control system for retarding and/or advancing ignition firing as a function of maximum cylinder pressure. The authors Glaser and Powell found that peak cylinder pressure did not decrease for settings of spark advance less than 10° before top dead center (BTDC) and, as a result, peak cylinder pressure measurements could not be used for a feedback control system of this type at relatively low speeds. Typically in such closed loop ignition control systems, relatively small spark advances are set to achieve low speeds. At higher speeds and, thus, higher spark advance angles, it appeared that cylinder pressure measurements could be used to effect a feedback type of control.

U.S. Pat. No. 4,002,155 of Harned teaches a closed loop ignition system in which engine knock-induced vibrations are are detected by an engine mounted accelerometer. The system counts the number of individual ringing vibrations that occur in a predetermined angular rotation of the crankshaft. When the number of ringing vibrations exceeds a first predetermined number, the engine spark timing is retarded and when the number of ring vibrations is less than a second predetermined number, the spark timing is advanced. Such a closed loop ignition system is applicable to engine control under load and at high engine speeds and is limited by the noise normally associated with the closing and opening of the engine valves and cylinder movement. Thus, the Harned et al system would not be particularly applicable to a closed loop controlled ignition system for setting the spark advance at low or idle engine speeds.

U.S. Pat. No. 3,897,766 of Pratt, Jr. et al. discloses a torque sensor which measures the twist in the output shaft of the prime mover to measure the torque. The measured torque and engine speed are used to close the loop about the engine. Such torque measurements are used to calculate horsepower by multiplying the torque by engine speed to optimize ignition control. It is apparent that such torque sensors could not be used for ignition control at engine idling speeds.

U.S. Pat. No. 4,026,251 of Schweitzer et al. describes a closed loop ignition control system that moves the control back and forth, i.e. dithering, to obtain an optimum value of spark angle. The dithering of an engine requires a relatively long period of time that would limit the usefulness of such a technique to motor control at stabilized, relatively high engine speeds.

Various types of closed loop fuel control systems for internal combustion engines have been developed in which the loop is closed about different engine parameters. One of the parameters about which the loop is closed is the composition of the exhaust gas as taught by Seitz in U.S. Pat. No. 3,815,561. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for very efficient operation of the engine. Various techniques have been employed to operate the engine at leaner air/fuel (A/F) ratios but the ability to achieve reliable closed loop control at the desired leaner A/F mixture is limited by the characteristics of available oxygen sensors. In order to reduce the A/F ratios the Seitz closed loop system employs a class zero servo action to control engine ignition whereby the engine oscillates about the correct stoichiometric mixture, which means that the controlled engine A/F ratio will oscillate about this parameter.

U.S. Pat. No. 3,789,816 of Taplin et al. measures engine roughness as the parameter about which the loop is closed. In this system, the A/F mixture is leaned out until a predetermined level of engine roughness is achieved. The magnitude of engine roughness is selected to correspond with a level of engine roughness at which the A/F mixture is made as lean as possible to the point that the formation of such exhaust gas as HC and CO is minimized without the drivability of the particular vehicle being unacceptable. Engine roughness as measured in the Taplin et al patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

U.S. Pat. No. 4,044,236 of Bianchi et al. teaches measuring the rotational periods of the crankshaft between two sequential revolutions of the engine. The differential is digitally measured in an up-down counter counting at a frequency proportional to the engine speed.

U.S. Pat. No. 4,044,234 of Frobenius et al. teaches measuring the rotational periods of two equal angular intervals, one before and one after the top dead center position of each cylinder position. The difference between the two rotational periods for the same revolution is compared against a particular reference value and an error signal is generated when the change exceeds the reference value. Frobenius in U.S. Pat. No. 4,044,235 teaches an alternate roughness control system wherein the periods of three sequential revolutions are compared to determine engine smoothness. The above discussion reflects various ways in which engine roughness as detected by various means including the variations in the rotational velocity of the flywheel is used to close the loop about the engine.

U.S. Pat. No. 3,957,023 of Peterson discloses a closed loop ignition control system that measures the occurrence of peak cylinder pressure and uses that parameter to adjust the spark angle so that the peak cylinder pressure occurs on the next cycle at the optimum angular position to obtain the best mean torque output from the engine under control. However, Peterson did not provide means operative at lower engine speeds that are capable of responding rapidly to adjust the spark firing angle so that his closed loop control would be stable. Instead, Peterson suggested that his system would produce spark ignition signal 180° out of phase that would cause engine speed oscillation.

U.S. Pat. No. 4,197,767 of Leung discloses a closed loop engine control system that measures the engine's temperature and the uniformity of crankshaft rotation to vary spark advance and fuel delivery. It is understood that when a load is applied to the engine that the period or time of crankshaft rotation will gradually increase. Leung employs sensor pick-ups disposed to sense the rotation of the engines crankshaft, measuring the output of the sensors to determine the time of each crankshaft rotation and the difference between the time intervals of rotation of successive rotations of the engine crankshaft, and uses such differences to control spark advance and fuel delivery. However, the Leung systems employs a flywheel coupled to its engine, that significantly reduces speed perturbations at medium and higher speeds, i.e. those speeds above 1500 RPM. In particular, the speed perturbations or differences between successive revolutions of the engine are damped out and, thus, the Leung closed loop engine control is unable to effect control based upon the imposition of engine load and the rotational speed changes.

Rotational forces are derived from engines by the igniting of air/fuel mixtures injected into cylinders, to impart rectilinear movement to pistons disposed within the cylinders of the engine, whereby rotational forces are imparted to a crankshaft. Spark plugs are disposed within each cylinder and are energized to create a spark igniting the fuel mixture; the spark is timed with respect to the TDC position of the crankshaft to cause burning of the A/F mixture to impart forces on the cylinder and, therefore, on the crankshaft at a point in time after the cylinder has reached its TDC position. The angular position of the crankshaft is typically measured with respect to the TDC position of the cylinder. In particular, the spark is generated at a point in time with respect to the angular position of the engines crankshaft; typically, the spark is generated at a position before the TDC position to ensure that the A/F mixture will be ignited and that the A/F mixture burning will take place at a point in time after the piston reaches its TDC position. The angular position of the crankshaft at the point in time that the spark is generated is commonly known as the spark advance angle $\theta a$ and is measured in reference to the TDC position. Because the spark advance angle $\theta a$ directly effects when the burning of the gas-air mixture takes place, the spark advance angle $\theta a$ also effects the amount of torque that will be delivered to the crankshaft. The relationship between the spark advance angle $\theta a$ and the crankshaft torque is a first order function and must be controlled precisely to obtain maximum fuel economy and to minimize the pollutants emitted by the engine.

Typically, engines of the prior art employ distributors rotatively coupled to the engine to close a set of switches typically known as "points" to apply a high voltage to energize the spark plugs, thus generating a spark to ignite the A/F mixtures. More specifically, the distributors include a cam that is rotatively coupled to the engine and disposed to contact the points, whereby a circuit to a corresponding spark plug is completed. The physical position of the points and thus the spark advance angle $\theta a$ could be adjusted by a mechanical device in the nature of a governor to adjust the spark advance angle $\theta a$ as a function of the engine speed. Typically, the spark advance angle $\theta a$ is increased as the engine speed increases. In addition, prior art devices have employed sensors disposed to measure the manifold vacuum or pressure to provide an indication of the mechanical load imposed upon the engine. At no load, the manifold vacuum is high; when a load is applied to the engine, the manifold vacuum decreases. Typically such manifold vacuum measuring devices employed a vacuum diaphragm, that is mechanically coupled to the distributor, whereby the position of the distributor points and thus the spark advance angle may be adjusted as a function of manifold vacuum and thus engine load. Because such mechanical devices are limited in terms of accuracy and the degree to which they be controlled, electronic controls and, in particular, closed looped ignition systems have been employed to increase fuel efficiency and to decrease pollution emission.

The U.S. Government has imposed increasingly strict controls on both pollution and fuel efficiency standards for gasoline fueled engines. It is readily appreciated that such standards are mutually exclusive in that as steps are taken to increase the fuel efficiency, it becomes increasingly difficult to maintain the levels of pollution emission. Such pollution controls and fuel efficiency standards are expressed respectively in terms of the weight of emitted pollutants (grams) per mile of vehicle travel and in miles per gallon, without consideration of vehicle weight or engine performance. Thus, auto manufacturers are required to meet these control and standards to manufacture lighter, but not necessarily safer vehicles.

As a result, vehicle performance has suffered. Vehicle performance may be considered as (1) the ability of an engine to delivery an optimum mean torque to its crankshaft and (2) the ability to run smoothly at all speeds and, in particular, to run smoothly at idle speed during warm-up periods. U.S. Government controls and standards require exhaustive vehicle testing under varying conditions as defined in a EPA's "Federal Urban Driving Test". This test requires that vehicle engine emit limited pollutants during its warm-up period; without pollution control devices, some engines emit over one half of their total pollutants during this warm-up period. To meet such EPA tests, many emission control systems retard the spark advance angle $\theta a$ during critical portions of the EPA such as during warm-up. A critical region, known as the EPA pocket, occurs at lower engine speeds while driving the urban "driving" cycle. Typically, emission control systems retard the spark advance angle $\theta a$ thus limiting pollution emission, but at the expense of good engine performance. In particular, the spark advance angle $\theta a$ is advanced as a non-linear slope function of engine speed. The mechanical devices of the prior art, as well as many of the electronic controls, are able to implement such a function of spark advance angle $\theta a$ versus engine speed linearly, but with relatively poor accuracy and limited adjustment and, in particular, that the engine can not be adequately timed to meet the new tough EPA standards.

In the prior art, manifold vacuum sensors have been used to sense engine load and, in particular, the manifold vacuum and to use that parameter to adjust, i.e. retard, the spark advance angle $\theta a$ as a function of increasing engine loads to prevent detonation. However to retard the spark advance angle $\theta a$, it is first necessary to advance the spark advance angle $\theta a$ when no load is placed upon the engine. However, this presents a problem at idle speeds in the order of 800 RPM, where the engine generally has no load imposed thereon and thus a high manifold vacuum. To solve this problem, mechanically implemented manifold vacuum sensors are coupled to a "ported" vacuum by connecting the vacuum line from a mechanical diaphragm to the manifold vacuum sensing above the throttle plate of the carburator, which prevents spark advance at idle speeds when the throttle plate is closed.

U.S. Pat. No. 4,015,566 of Walh discloses an electronic ignition system for an internal combustion engine that controls the timing of the ignition instant with respect to the measured crankshaft position as function of engine speed. In particular, the Walh system employs a transducer for providing a first train of pulses, one pulse for each revolution of the crankshaft, and a second train of speed pulses. The first and second trains of pulses are applied to a digital/analog converter with which includes an electronic counter. The output of the digital/analog converter is apparently indicative of the crankshaft position and is applied to a comparator. The second train of speed pulses is applied to a speed-voltage converter whose output as representative of crankshaft or engine rotational speed is applied to a function generator which generates a signal representative of ignition timing dependent upon the sensed crankshaft rotation to be applied to the comparator, which compares the two input signals and upon coincident, applies a signal to the engine distributor to effect ignition control.

As described above, ignition control is effected by setting the ignition instant with respect to the TDC position to define the degree of the spark advance angle $\theta a$ therewith. Considering the Wahl and like systems, the crankshaft position transducer or sensor may be coupled to the distributor shaft which is geared down by a ratio of 2:1 with respect to the crankshaft of a four cycle Otto engine. For such a four cylinder engine, such the crankshaft position transducer would output four pulses (of the first train) for each revolution of the distributor shaft and two pulse for each revolution of the crankshaft. At low speeds in the order of 600 RPM, the crankshaft revolves only 10 times per second. At 6000 RPM, the crankshaft revolves 100 times per second. Thus at 600 RPM, the transducer would output two such speed pulses per crankshaft revolution or one pulse every 1/20 of a second. In practice, the ignition instant occurs within an arc of the crankshaft rotation from a 45° BTDC position to its TDC position. As a practical matter, data indicative of this arc of crankshaft rotation is the only data of interest for spark advance timing. In such systems as described by Walh, the crankshaft position information is dependent upon the manner in which the second train of speed pulses is accessed and measured. The Walh system is typical of many systems in which the speed information and thus the measurement of crankshaft position is obtained from the last revolution of the crankshaft, i.e. the Walh crankshaft position transducer outputs only a single crankshaft pulse permitting the reset of its counter only once per revolution of the crankshaft. Thus at relatively low speeds in the order of 600 RPM, where engine control in terms of pollution and efficient operation are the most difficult, the resolution of the position data is in the order of about two cycles per second.

Thus, it has been found difficult to meet the increasingly difficult pollution controls and fuel efficiency standards as set by the U.S. Government by employing control techniques, whether mechanical or electronic, that set the spark advance angle $\theta a$ as a function of a single parameter such as engine speed or load (as indicated by the manifold vacuum). To achieve these goals, increasingly complex closed loop controls have been developed which employ a microprocessor for the adjustment of the spark advance angle $\theta a$, the A/F ratio, the exhaust gas recirculation, etc. Illustratively, such microprocessor implemented ignition control systems employ a crystal oscillator to produce a train of accurate clock pulses that are gated to a counter, one train of pulse for each revolution of the engine crankshaft or distributor. The number of pulses accumulated in the counter at the end of an interval is thus proportional to the period of the crankshaft revolution or inversely proportional to crankshaft speed fs. The microprocessor is programmed to calculate crankshaft speed and uses this value to obtain an indication of crankshaft position of at least a specified angle of interest of the crankshaft rotation. However, such a measurement of engine or crankshaft speed as based upon a single pulse train per revolution is inadequate to achieve the desired degree of control, as contemplated by this invention. More specifically, the prior art computes engine speed based on the last cycle of the crankshaft and, if a change of crankshaft speed has occurred as would be expected during engine acceleration, the value of crankshaft speed derived as by integrating the applied pulses proportional to speed would be in error by an amount portional to the degree of acceleration or deceleration. Further, it is apparent that if the indication of crankshaft speed is based upon a single pulse train per revolution, any speed perturbations due to the firing of the cylinders, whereby the crankshaft alternately accelerates and decelerates during the course of a single revolution of the crankshaft, can not be taken into account by such control systems. Cylinder firing perturbations may cause the instantaneous rotational speed to vary as much plus or minus 60 RPM; at low or idling speeds in the order of 600 RPM, such perturbations may account for an instantaneous speed error of approximately 10%. Thus, such microprocessor implemented ignition control systems could not be used to set the spark advance angle $\theta a$ very accurately at low speeds. The magnitude of the resulting errors in ignition control are thus the greatest at idle and/or relatively slow engine speeds and for engines with fewer cylinders. Typically, such computer implemented systems provide a "retard" error when the engine is accelerated and an "advance" error when the engine is being decelerated; both such errors degrade engine performance and contribute unfavorably to the emission of pollutants.

Further, the computer implemented ignition control systems employ a read-only-memory (ROM) that is used as a look-up table of spark advance angles, whereby values of engine speed are used to address corresponding values of the spark advance angle $\theta a$. The stored values of $\theta a$ are determined empirically for each engine to be controlled. Obviously, if the addressing value of engine speed is inaccurate, then the resultant value of the spark advance angle $\theta a$ is in error. As a result, most ignition control systems, even those employing microprocessors, unduly retard the spark advance angle $\theta a$ within the "EPA Pocket" of engine speeds, thus resulting in poor engine performance.

SUMMARY OF THE INVENTION

It is therefore an object of this invention to provide a new and improved ignition control system to accurately obtain an indication of engine speed, whereby the ignition and, in particular, the spark advance angle $\theta a$ may be accurately controlled.

It is a further object of this invention to provide a new and improved ignition control system, whereby engine performance may be improved and the emission of pollutants is decreased at low as well as high engine speeds.

It is a still further object of this invention to provide a new and improved ignition control system, wherein an indication of engine speed is achieved with greater resolution and thus accuracy.

It is a still further object of this invention to provide a new and improved ignition control system that is capable of obtaining with a high degree accuracy an indication of the position of the engine's crankshaft, whereby the timing of the ignition instant and, thus, the spark advance angle $\theta a$ may be achieved.

In accordance with these and other objects of the invention, there is disclosed an electronic ignition system for controlling as a function of a selected engine parameter the ignition instant of an internal combustion engine having at least one cylinder and a piston disposed therein and coupled to a rotatable crankshaft of the engine to define a first reference position with respect to the crankshaft. The ignition instant occurs upon the termination of an arc of crankshaft rotation at a second variable position with respect to the first reference position. The arc of crankshaft rotation starts at a third reference position fixedly disposed before the first reference position considering the rotational direction of the crankshaft. The electronic ignition system comprises a first sensor responsive to crankshaft rotation for providing a first train of signals of a first frequency, each first signal occurring in time when the crankshaft rotates past its third reference position, and a second sensor responsive to crankshaft rotation for providing a second train of signals of a second frequency greater than said first frequency and proportional to the speed of angular rotation of the crankshaft. A counter is coupled to receive the first and second trains of signals and actuated upon the occurrence of each signal of the first train for integrating the second train of signals to obtain an indication of the present crankshaft position with respect to the first reference. A transducer is responsive to the selected engine parameter, e.g. the rotation speed of the crankshaft, to set the second variable position, whereby engine ignition is effected when the present crankshaft position matches the set first variable position.

In a preferred embodiment of this invention, the indication of speed is applied to a memory storing a plurality of counts, each count being empirically determined to provide the maximum mean torque output of the engine for a corresponding speed. The accessed count is transferred from the memory to the counter, to be counted or decremented to a predetermined level, at which time an output is provided to effect engine or cylinder ignition.

In a still further aspect of this invention, the second train of signals is applied to a closed loop circuit comprising a phase comparator for providing an error signal indicative of the difference between the signals of the first train and a third train of signals. The error signal is applied to an oscillator that provides a third train of signals proportional to the magnitude of the error signal and a feedback loop that applies the third train of signals to the phase comparator. Further, a filter may be disposed to filter the error signal of the phase comparator, whose impedances are set to define a time constant such that instantaneous changes of speed corresponding to those perturbations induced by cylinder firings, are averaged out.

In a further embodiment of this invention, the second train of signals of the greater frequency is applied to an integration circuit to provide a signal indicative of the rotational speed of the crankshaft. The first train of pulses is applied to the digital phase comparator whose output error signal along with the integrated indication of crankshaft speed is applied to the oscillator of a closed loop circuit similar to that described above. In this embodiment, the sensor providing the second train of signals may be manufactured to a lower degree of precision, thus reducing manufacturing cost.

BRIEF DESCRIPTION OF DRAWINGS

A detailed description of a preferred embodiment of this invention is hereafter made with specific reference being made to the drawings in which:

FIGS. 3A to 3H are timing diagrams of the signals developed within the functional block diagrams of FIGS. 1 and 2;

FIGS. 4A, 4B, and 4C graphically show signals as developed by the ignition control system of FIG. 2;

FIG. 7 is a functional block diagram of a further embodiment of this invention that reduces the need for extreme accuracy in the manufacture of the high frequency encoder disc;

PREFERRED EMBODIMENT OF THE INVENTION

Figure 1:
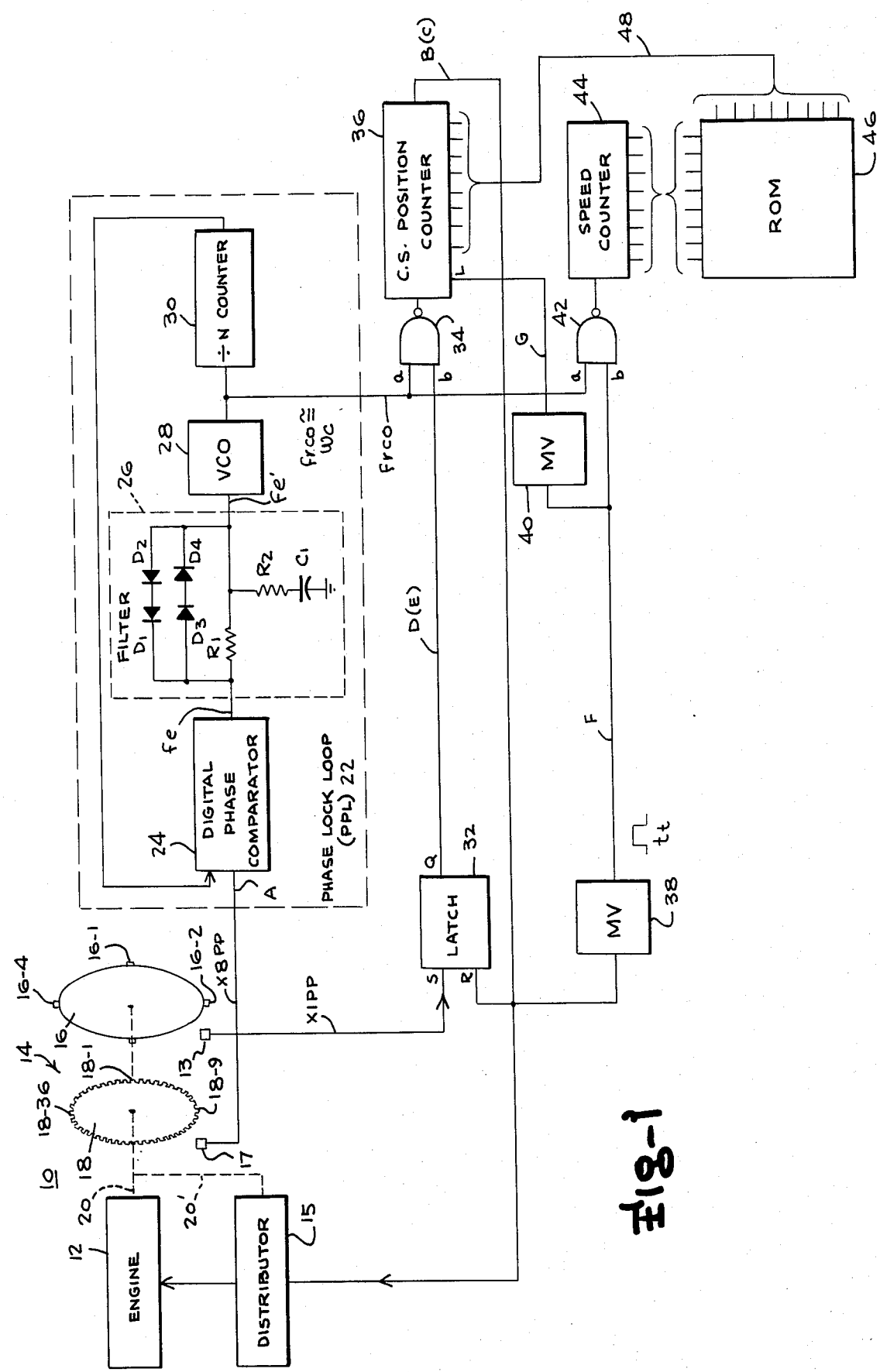
FIG. 1 is a functional block diagram of a closed loop ignition control system for accurately setting the spark advance angle $\theta a$ of the engine to be controlled in accordance with the teachings of this invention.

Referring now to the drawings and, in particular, to FIG. 1, there is shown a closed loop, ignition control system 10 for setting the spark advance angle $\theta a$ and, thus, the ignition instant for an engine 12. In particular, a timing or spark control signal is applied to a distributor 15, whereby the ignition instant of the spark plugs (not shown) of the engine 12 is timed in accordance with a calculated spark advance angle $\theta a$. To this end, the ignition control system 10 includes a crankshaft position encoder 14 comprised of a first encoder disc 16 and a second encoder disc 18, both rotatively coupled by an interconnection 20 to a crankshaft of the engine 12 or, preferably, by a coupling 20' to the distributor 15, whereby the rotation of the engine 12 or the distributor 15 rotates synchronously the encoder discs 16 and 18.

Figure 5:
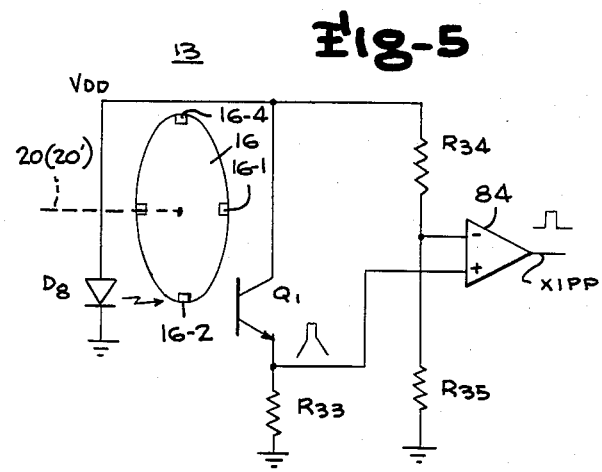
FIG. 5 is a detailed circuit diagram of the engine speed encoder as incorporated within the functional block diagrams of FIGS. 1 and 2.

A pair of encoder position sensors 13 and 17 is respectively associated with the first and second encoder discs 16 and 18, to provide, as will be more fully explained with respect to FIG. 5, a pulse indicative of the angular rotation of the disc and therefore of the engine's crankshaft. In an illustrative embodiment of this invention, the engine 12 includes 4 cylinders though it is understood that this invention may be readily adapted to control an engine with any number of cylinders. Illustratively, the encoder position sensor 13 senses the rotation of the disc encoder 16 and, in particular, the rotation of each of its portions of 16-1 to 16-4, each portion being positioned 90° from an adjacent portion for the illustrative embodiment of a four cylinder engine. As is customary in the art, the portions could take the form of teeth like members or transparent portions to respectively transmit or block the passage of light, whereby the passage of each such portion is sensed and a corresponding pulse, designated in FIG. 1 as X1PP, is generated. Thus, the encoder position sensor 13 will generate four pulses X1PP per revolution of the disc 16.

Significantly, the encoder position sensor 13 is disposed critically at a position such that sensor 13 generates a pulse when the engine crankshaft is at its 45° BTDC position. The encoder position sensor 17 senses the rotation of the encoder disc 18 and, as shown in FIG. 1, disc 18 includes eight times as many members as does disc 16, to thereby output eight times as many pulses X8PP. For the particular, illustrative embodiment of a four cylinder engine, the encoder disc 18 includes portions 18-1 through 18-36 disposed about its periphery to thereby output 32 pulses X8PP per revolution of the disc 18. In the illustrative embodiment, wherein the encoder discs 16 and 18 are coupled by the coupling 20' to the distributor 15, the encoder position sensor 13 outputs four pulses per revolution of the distributor, whereas encoder position sensor 17 outputs 32 pulses per revolution of the distributor. As will become apparent from the remaining description, the position of the encoder position sensor 17 is not critical as long as the portions are equally spaced.

Referring now to FIG. 5, there is shown a detailed circuit schematic of the encoder position sensor 13 as comprised of a light emitting diode (LED) 8 that is energized by a voltage VDD to emit light that is focused by suitable means to be intercepted by one of the rotating portions 16-1 through 16-4. In the embodiment illustrated in FIG. 5, the portions are designed to be light transmissive, whereas the remaining portion of the encoder disc 16 is opaque to light. Thus, as one of the light transmissive portions 16-1 through 16-4 is rotated past the LED D8, the emitted light is permitted to pass therethrough onto a photo transistor Q1 that outputs a pulse; as shown in FIG. 5, the collector of the photo transistor Q1 is coupled via resistor R33 to ground. The emitter of photo transistor Q1 is coupled also to the positive input of an operational amplifier 84, whose negative input is biased at a level set by the voltage divider comprised of resistors R34 and R35. As illustrated, the operational amplifier 84 responds to the input signal whose occurrence is indicative of the rotation of the encoder disc 16, to output a sharply defined pulse, X1PP. It is understood that the encoder position 17 may be similarly designed as that circuit shown in FIG. 5. The output pulses from each of the encoder position sensors 13 and 17 must have a fast rise time and may not be "moved" as would occur with magnetic reluctance type sensors. Likewise, the use of Hall effect transistors that make use of a magnetic field that is interrupted to define position, do not provide the desired resolution and are deemed unpredictable for very accurate position sensing under all dynamic conditions of the coupling 20' or 20. Infrared LED's and photo transistors have proved an inexpensive, accurate means for providing reliable output pulses of fast rise time. The encoder disc 16 could also be made as a reflection plate having one dark surface to define the X1 and X8 pulses. This is a more economical way to implement this invention.

As shown in FIG. 1, the X8PP pulses derived from the encoder position sensor 17 are applied to a phase lock loop (PLL) 22 which functions as an electronic servo to compare its output signal identified as fvco with the X8PP pulses to develop an error signal which corrects the output as the error signal approaches zero. Illustratively, the PLL 22 comprises a digital phase comparator 24, which in one illustrative embodiment of this invention may take the form of a type CD-4046 as manufactured by RCA. The phase comparator 24 functions to develop an error signal fe as a sequence of pulses of a width proportional to the difference in time (phase) that the leading edge of an incoming pulse X8PP is to the leading edge of an output pulse fvco. The error signal fe is filtered by a lead-lag filter 26, which provides a filter output fe' to a voltage controlled oscillator (VCO) 28, which outputs a signal of a frequency proportional to the voltage magnitude of the input, filtered signal fe'. The accuracy of the VCO 28 is not significant in that it is disposed within the closed loop circuitry of the PLL 22 and may illustratively take the form of a VCO identified as in the model number CD-4046 manufactured by RCA. In turn, the output of the VCO 28 is applied to a divide by N counter 30 whose output is applied to an input of the phase comparator 24. As illustrated in FIG. 1, the output fvco of the PLL 22 is selectively gated, as will be explained, by an AND gate 34 to be applied to a crankshaft (CS) position counter 36, whose output is applied, as will be explained, to the distributor 15 to control the firing of the engine spark plugs. The CS position counter 36 has a capacity in the sense that upon receiving a number of inputted pulses equal to that capacity, the counter 36 outputs an overflow pulse; illustratively, the CS position counter 36 has a capacity of 255 pulses. Correspondingly, the output of the VCO may be divided by the divide by N counter 30 by any number N so that the output fvco of the VCO 28 will fill the counter 36 to its capacity for a given angular revolution of the crankshaft. For the particular encoder 14 as illustrated in FIG. 1, a revolution of the crankshaft of the engine 12 of 45°, and thus the encoder discs 16 and 18 will produce 255 pulses, thus filling to capacity the CS position counter 36.

As will become evident from a further description of this invention, the CS position counter 36 counts the selectively gated pulses comprising the signal fvco indicative of the rotational velocity of the engine's crankshaft, to provide an accurate, high resolution signal indicative of the angular position of the crankshaft with respect to a reference point, e.g. the 45° BTDC position. As indicated above, the encoder position sensor 13 is accurately disposed at the reference point so that upon rotation of one of the portions 16-1 through 16-4 of the encoder disc 16 past the reference point, a single pulse X1PP is output and applied to the set input S of a latch 32, whereby a positive going signal is generated at a point in time corresponding to when the engine crankshaft is disposed at its 45° BTDC position. As illustrated in FIG. 1, the Q output of the latch 32 is applied to an input a of the AND gate 34, thereby initiating the gating of the output of the PLL 22 and, in particular, of the output fvco of the VCO 28 via the AND gate 34 to be counted by the CS position counter 36. When a number of the output pulses of the signal fvco equal to either the capacity of the counter 36 or to a preset number as derived from a read-only-memory (ROM) 46, an output pulse is applied to each of the distributor 15 thereby firing of the spark plugs of the engine 12, to a reset input R of the latch 32 thereby resetting the latch 32 and disabling the gate 34, and also to a monostable multivibrator (MV) 38. In response thereto, the MV 38 outputs a sharp pulse of defined pulse width tt to be applied to an input b of an AND gate 42; the output fvco of the PLL 22 is applied to a second input a of the AND gate 42, whereby a number of the pulses of the signal fvco is applied to a speed counter 44. As indicated above, the frequency of the signal fvco is indicative of the rotational speed of the engine 12 and, in particular, its crankshaft. The pulse width tt of the output of the MV 38 is scaled so that the highest rotational velocity of the engine's crankshaft will produce a corresponding output fvco of the PLL 22 that will fill the speed counter 44 to its capacity as the crankshaft rotates through an arc of 45°. It is assumed that the speed counter 44 has a capacity of 256 pulses. Thus, for a maximum frequency of the output fvco of the VCO 28 of 204,800 Hz., corresponding to an engine rotational speed of 6000 RPM., the pulse width tt is 1.25 ms. As described, the digital number appearing on the outputs of the speed counter 44 is indicative of the speed of the engine's crankshaft, and is applied to the ROM 46 to address that location within the ROM's lookup table, wherein the corresponding eight bit binary number indicative of the spark advance angle $\theta a$ is stored. The addressed number is, in turn, applied via bus 48 to set a count into the CS position counter 36. Thus, when the position counter 36 times out, an output signal indicative of the desired spark advance angle $\theta a$ is applied to distributor 15, whereby the spark plugs are energized at the ignition instant. It is understood that the eight bit binary numbers stored in the ROM 46 are empirically determined by applying controlled loads to a particular engine 12 of interest and determing that spark advance angle $\theta a$ that will deliver an optimum mean torque output to its crankshaft for a particular rotational speed or the minimum required pollutants. Thus, it is apparent that each set of eight bit binary numbers stored in the ROM 46 will depend upon the individual characteristics of its engine 12 and will significantly differ from the linear control functions of spark advance angle $\theta a$ versus engine rotational speed as employed by some devices of the prior art.

Upon the trailing edge of the output pulse tt of the MV 38, a load monostable multivibrator MV 40 is set to provide an output to a load input L of the CS position counter 36, whereby the addressed eight bit binary number within the ROM 46 is transferred via bus 48 to preset the CS position counter 36. It will be understood that the output of the MV 40 goes high after the speed counter 44 has been loaded and will time out in a period of 500 microseconds, a time period sufficient to permit the eight bit binary number to be transferred from the ROM 46 to the CS position counter 36.

The operation of the closed loop ignition control system 10, as shown in FIG. 1, will now be explained with respect to the timing diagrams of FIGS. 3A to 3G. The signal wave forms illustrated in FIGS. 3A to 3G appear on the conductors of FIG. 1 as marked with corresponding letters A to G. The crankshaft position encoder 14 and, in particular, its discs 16 and 18 are coupled to rotate with the rotation of the engine's crankshaft and distributor 15, to provide the first train of pulses 1X8PP as shown in FIG. 3A and a second train of pulses (not shown) of a frequency eight times that of the first train of pulses. The second train of pulses are applied to the PLL 22, which in turn provides an output fvco from its VCO 28. The capacity of the CS position counter 36 is set as explained above to 255. Each of the second train of pulses X1PP sets the latch 32, whose output (D or E) in turn enables the AND gate 34 to apply the signal fvco to the CS position counter 36. In the embodiment wherein the coupling 20' interconnects the encoder discs 16 and 18 to the distributor 15 to provide a two-to-one gearing therebetween, one-half revolution of the encoder disc 18 correspond to a single revolution of the crankshaft of the engine 12 so that the encoder position sensor 17 generates 16 pulses for each revolution of the crankshaft. As explained above, the output of the VCO 28 is scaled so that the capacity, e.g. 255 counts, corresponds to an angular rotation of the crankshaft of 45°; thus, 255 counts equals 45° or one count equals (45/255) or 0.177 degree, which is the resolution that the digital output of the CS position counter 36 is able to achieve in setting the spark advance angle θa. The 0.177 degree resolution as achieved by the illustrative embodiment of this invention compares with a resolution of 360° by the prior art closed loop ignition control systems, which, as described above, results in unacceptable engine performance at low or idling speeds in terms of pollution emission and smooth operation and of providing an optimum mean torque to its crankshaft. Further, if the gate 34 was enabled for an extended period of time, the CS position counter 36 would count to its capacity of 255 eight times for each revolution or 360° rotation of the engine's crankshaft. Thus, for each revolution of the crankshaft, the VCO 28 must output eight×256 or 2048 pulses, to ensure that the output frequency of the VCO 28 is precisely proportional to the crankshaft speed. In the illustrative embodiment of this invention where the engine 12 has four cylinders and a two-to-one coupling 20' is employed between the distributor 15 and the encoder discs 16 and 18, the frequency of the VCO 28 is scaled so that at a maximum engine speed of 6000 RPM, its output frequency equals 8×256×6000×1/60=204.8 KHz, whereas the output of the VCO 28 for an engine speed of 60 RPM would be 2.048 kHz, thus providing a frequency range of 100 to 1 that has proven to be practical and readily obtainable.

It is also recognized that the encoder discs 16 and 18 could be located directly on the crankshaft of the engine 12, thereby eliminating the errors of backlash in the gearing between the crankshaft and the distributor 15, but noting that only one-half of the portions are required.

If no count is preset in the CS position counter 36, the capacity of the counter 36 and the frequency of the output of the VCO 28 has been set such that, the counter 36 will overflow to provide an output at a point in time corresponding to the TDC position of the crankshaft, as shown in FIG. 3B. However, if the counter 36 is preset with an eight bit binary number from the ROM 46, the counter 36 will time out more rapidly to advance the spark advance angle θa as illustrated in FIG. 3C, where as shown the counter output occurs at a point in time corresponding to a spark advance angle θa of 22.5° BTDC if the preset count was of a value of 128. FIG. 3D illustrates that period in which the latch 32 is set, if no count is preset into the counter 36, whereas FIG. 3E illustrates that period that the latch 32 is set if a count is preset into the counter 36 to generate a spark advance angle θa of 22.5° BTDC.

As explained above, the output of the CS position counter 36 is applied to actuate the distributor 15 to fire the spark plugs in the engine 12, as well as to the MV 38, which generates a preset gating pulse tt as illustrated in FIG. 3F, which serves to enable the gate 42 to apply for a preset period of time the output fvco of the VCO 28 into the speed counter 44, whose output provides an indication of crankshaft speed. The MV 40 responds to the trailing edge of the tt pulse to generate a further, fixed pulse width pulse, as illustrated in FIG. 3G, that is applied to the load input L of the CS position counter 36, whereby the addressed eight bit binary word is applied from the ROM 46 via bus 48 to the counter 36. In this manner, a value of speed is calculated in the speed counter 44 to address the lookup table within the ROM 46 to obtain a corresponding, empirically determined value of the spark advance angle θa, which is transferred to the CS position counter 36. Significantly, the second train pulses as derived from the encoder position sensor 17 is a high resolution signal providing an indication of crankshaft position to an accuracy of 0.177°, whereby an output is derived from the CS position counter 36 at a point in time to fire the engine spark plugs at an accurately set time with respect to the crankshaft position.

Figure 6:
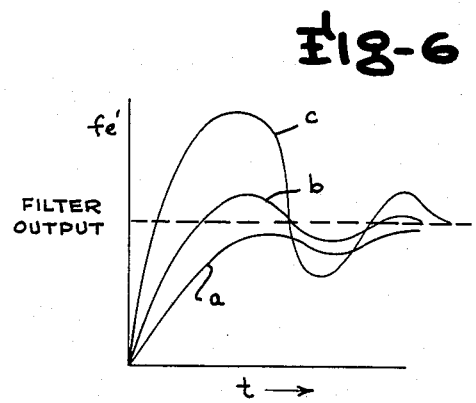
FIG. 6 is graphical representation of the possible damping curves effected by the filter of the control system shown in FIG. 1.

Referring now to FIG. 1, the operation of the filter 26 will be explained with respect to the overall operation of the PLL 22 and the closed loop ignition control system 10. The filter 26 comprises a resistor R1 to which is applied the output signal fe of the digital phase comparator 24, and a second resistor R2 and a capacitor C1 connected therefrom to ground. An output fe' is developed across the resistor R2 and capacitor C1 to be applied to the VCO 28. The impedance of values assigned to the resistors R1 and R2 and to the capacitor C1 determine the time constant of the filter 26. As well recognized in the art, the PLL 22 comprises a control loop whose operation is effected by the time constant of its filter 26. In particular, the time constant of the filter 26 may be set such that the frequency of the second train of pulses X8PP is lower and thus the phase angle is less whereby the filter 26 will respond to these low frequency signals, but will integrate those input signals of higher frequency, except in the normal roll-off rate of the filter 26. The degree of affect or damping imparted by the filter 26 to the input pulses X8PP less the output pulse of the counter 30 is illustrated generally in FIG. 6. In particular, FIG. 6 shows the degree of response or damping, wherein curve a is overdamped, curve b is critically damped, and curve c is underdamped. The overall frequency response of the PLL 22 follows that of its filter 26 and it is configured that the output signal fe' of the filter 26 must tract the physical characteristics of the rotating crankshaft without producing dynamic errors that would affect the spark timing. In particular, as the engine 12 and its crankshaft is accelerated or decelerated, the corresponding signal fe' tracts these changes respectively.

In addition, the movement of the crankshaft even through a single revolution thereof is not of a constant angular velocity, but is rather subject to second order effects or perturbation in the form of periods of acceleration and deceleration imposed by the torque impulses produced when the individual cylinders fire and/or rough running at the start up of the engine 12 at low speeds. Such perturbations impose frequency components on the pulses X8PP that are in effect averaged out. In particular, the values of the impedance of resistor R1 relative to that of resistor R2 acting with capacitance C1 is set to average out these perturbations. In the illustrative example, where the frequency of the error signal fe is in the range of DC to 10 Hz, the resistors R1 and R2 have values of 100K and 22K ohms and capacitor C1 is set at 0.25 uf, whereby the damping ratio and the time constant of the filter 26 are respectively 11:1 cps and 10 cps.

A significant aspect of the electronic ignition control system 10 as shown in FIG. 1 is that it employs the PLL 22 to generate accurately an output signal fvco indicative of crankshaft rotational speed. The advantages of the electronic ignition control system 10 are particularly evident at low or idling engine speeds in the order of 600 to 1800 RPM. In particular, the output signal fvco of the PLL 22 is compared to that speed input signal as derived from the sensor 17 and a proportional adjustment is made in the form of an error signal fe that is reduced toward zero to thereby set the output signal to provide an accurate indication of crankshaft rotation. The static accuracy of the electronic ignition control system 10 is insured by providing the high frequency speed signal from the sensor 17 with a corresponding high degree of resolution or accuracy. Dynamic accuracy is also important and must be a first order consideration.

Basically as explained above, the output of the CS position counter 36 is a real time pulse that occurs at the ignition instant to fire the gas/air mixture in an engine cylinder and is advanced or retarded within the crankshaft arc of interest to derive the best mean torque output from the engine 12 as a function of the sensed engine parameter, i.e. speed as measured by the system 10 of FIG. 1. Accurate closed loop control is complicated due to problems associated with speed perturbations caused by cylinder firing and to the varying of the load imposed upon the engine 12. Further, it is desired to make speed changes accurately in response to operator commands. In particular, the electronic ignition control system 10 should output a pulse from its CS position counter 36 at the ignition instant that will not be changed due to varying demands of engine power or operator commands of changing speed. The closed loop control as employed by the system 10 of FIG. 1 is particularly adapted to overcome such problems in that the PLL 22 developes a significant gain that serves to compensate for engine wear that would otherwise reduce the ability of the engine and its control system to adapt to changing loads and operator commands for speed change, especially when considered in comparison with known open loop control systems of the prior art.

The PLL 22 and, in particular, the filter 26 integrates the speed signal derived from the sensor 17 that would cause an open loop system to sustain long term drift. In particular, the impedances of the resistors R1, R2, and capacitor C1 are such that the time constant of the filter 26 in the phase lock loop 22 is at least on the order of magnitude less than that the time constant required in an open loop filter, assuming the same rate of data input from the sensor 17. This setting of the time constant allows engine spark timing even if the parameters are rapidly changing as would occur to crankshaft speed if a cylinder misfired.

Figure 8A:
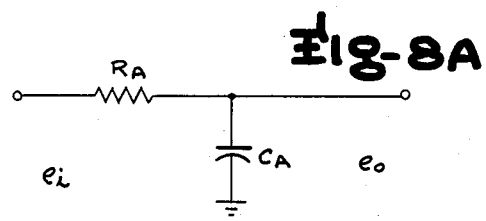
FIG. 8A discloses a circuit diagram of a simple lag filter and FIG. 8B discloses the transform function of the lag filter of FIG. 8A in a manner to explain the operation of the filter of the phase lock loop as shown in FIG. 1.
Figure 8B:
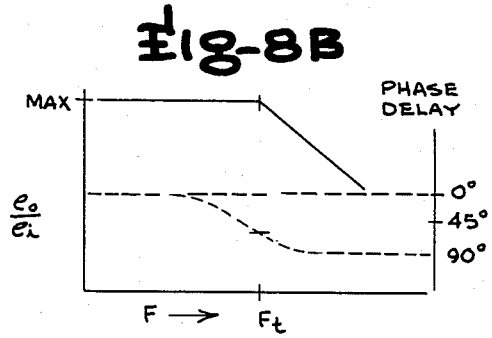

It is recognized that the output of a control system can an assume a value in real time based upon the delays imparted by the discrete elements of the feedback loop. These delays or leads are imparted by the control system and, in particular, by its feedback loop to define the "bandwidth" of the overall control system. It is evident that the rate of change of the input signal of the PLL 22, i.e. its data rate, must be less than the delays as imparted by the various elements of the PLL lock loop 22. As described in *Design of Phase-Lock Loop Circuits*, published by SAMS, by Howard Berlin (particularly reference being made to pages 133 to 150). The operation of a filter such as the filter 26 may be defined by its transform function. In particular, the output of a filter is plotted in terms of its output to a phase shift to the input frequency. A simple lag filter is shown in FIG. 8A and its transform function is shown in FIG. 8B, wherein the amplitude of the ratio of the output to the input signals, as well as the phase shift of the output signal relative to that of the input signal, are plotted as a function of the frequency of the input signal. As shown in 8B, the amplitude of the ratio of the output to the input signal remains substantially constant for increasing frequencies of to a value of ft, after which this amplitude decreases at a rate of 6 Db per octave of frequency increase. Note that at frequency ft that the phase shift is 45° degrees. The operation of a closed loop such as the PLL 22; however, such a simple lag filter as shown in FIG. 8A would not be suitable for use in the PLL 22 in that a simple RC lag filter would induce a 45° phase shift and thus a 45° error, if the time constant of such a filter was in the region of the frequency of interest where engine 12 is operated, and if the control circuit were open loop.

The normal errors associated with the operation of a closed system control loop, such as shown in FIG. 1, are noise, limited or finite open loop gain, and dynamic errors. Considering the electronic ignition system 10 as shown in FIG. 1, noise will appear in the speed signal derived from the sensor 17 due to the fact that the spacings between the portions 18-1 and 18-36 are not precisely equal. Noise also will appear on the speed signal due to the uneven rotation of the crankshaft because of the finite torque impulses imparted by the cylinders' firings. Increasing the bandwidth of the control system will prove ineffective to offset these errors. The second major source of errors is the limited gain of the PLL 22. A third, dynamic error is due to the finite bandwidth of the electronic ignition control so that the frequency of the output does not precisely follow changes of the frequency of the input signal.

Figure 9A:
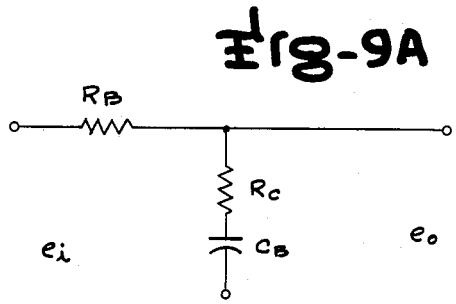
FIG. 9A is a circuit diagram of a lead-lag filter similar to that incorporated into the phase lock loop of the ignition control system of FIG. 1.
Figure 9B:
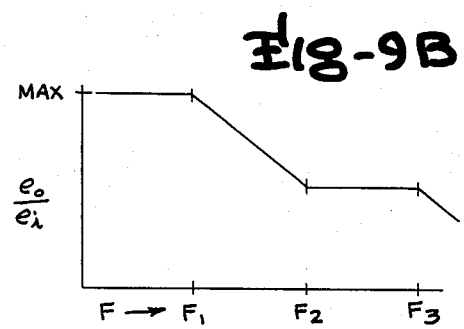
FIG. 9B shows the transfer function of the lead-lag filter of FIG. 9A.

In order to stabilize the operation of a feedback control loop and, in particular, the PLL 22, the phase shift of the output signal must be less than 180° before the amplitude of the ratio of eo to ei becomes unity; otherwise if the feedback is 180° out of phase, the control loop will be destabilized and go into oscillation. A simple RC lag filter as shown in FIG. 8A does not provide sufficient bandwidth to stabilize such a control loop. Rather, a lead lag filter circuit 26 as shown in FIG. 1 or that shown in FIG. 9A may be selected. The transfer function of the lead-lag filter is shown in FIG. 9B as rolling off at a rate of 6 Db per octave from a frequency f1 to f2, whereat the time constant leads and, thereafter, the response rolls off at a rate of 6 Db per octave. Such a lead-lag filter as incorporated into FIG. 1 sets the damping of the closed loop to obtain a higher gain and to provide maximum bandwidth. It can be demonstrated that bandwidth of the lead-lag filter 26 is at least 4 octaves above the expected bandwidth of the engine 12, e.g. 1 to 1¼ CPS. For example, if the impedance values of R1, R2, and C1 are selected to be 68K, 18K and 0.2uf, f1 may be calculated to be in the order of 9.26 and the ratio of f1 to the engine cut off frequency is in the order of a ratio of 7.4 to 1.

Figure 2:
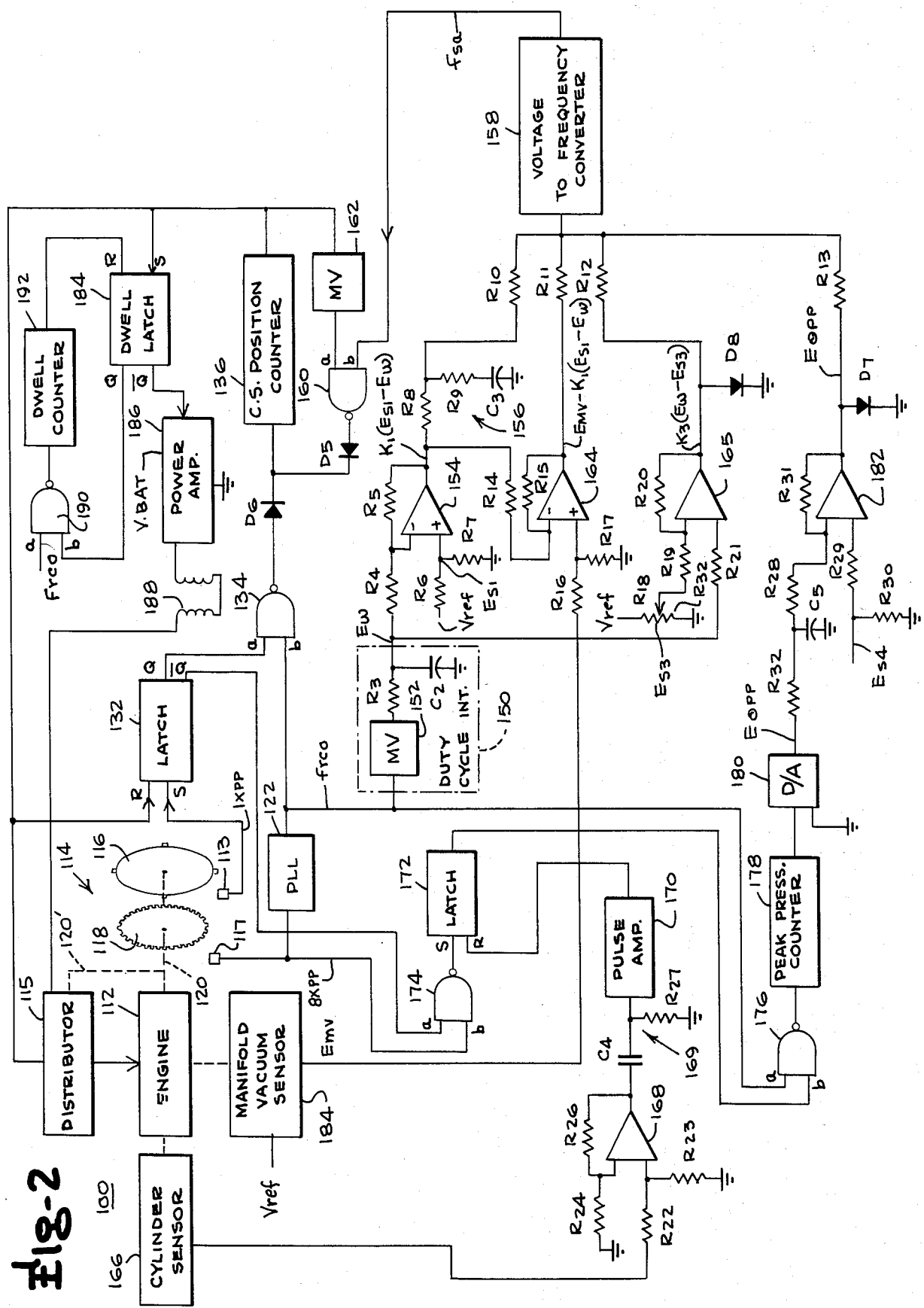
FIG. 2 is a functional block diagram of a further embodiment of this invention that provides an indication of engine speed with high resolution, as well as to obtain measurements of manifold vacuum and cylinder position to thereby control the spark advance angle $\theta a$.

Referring now to FIG. 2, there is shown a closed loop, electronic ignition control system 100 as a second embodiment of this invention, in which like elements are identified with like numerals but in the hundred series. In addition to adjusting the spark advance angle $\theta a$ as a function of engine speed, the ignition control system 100 comprises a manifold vacuum sensor to measure the manifold vacuum and in turn the load imposed upon the engine 112, as well as a cylinder pressure sensor 166 to provide an indication of cylinder pressure. In addition, an idle speed control is provided whereat engine speeds below a designated RPM, the spark advance angle $\theta a$ is retarded as engine speed increases.

First, an analog speed signal E is output by a duty cycle integration circuit 150 comprised of a monostable multi-vibrator (MV) 152 and a low pass filter comprised of resistor R3 and capacitor C2. The time constant of the low pass filter 150 is significantly higher than the highest rate of acceleration as would be imposed on the crankshaft of the engine 112, whereby this filter may not effect, i.e. attenuate, the signal fvco. As indicated above, the signal fvco is scaled to have a minimum value of 2.048 kHz, whereby no ripple over some minimum value will be presented at the filter output E, wherein the filter time constant is selected some eight octaves above the bandwidth of the signal fvco. The output signal E of the duty cycle integrator 150 is an analog voltage proportional to the rotational speed of the crankshaft and is applied via a resistor R4 to the negative terminal of an operational amplifier 154. A reference voltage Vref is applied to a voltage divider comprised of resistors R6 and R7, which develops a voltage Es1 that is applied to the positive input of the operational amplifier 154, to provide an output signal K1(Es1-E). The resulting output signal of the operational amplifier 154 K1(Es-E) is a control signal that goes to zero when E is greater than Es1, where Es1 is scaled to be equal to the value of E that is outputed by the duty cycle integrator 150 at 600 RPM and a maximum value of the output signal E is 5 volts at 6000 RPM. The operational amplifier 154, as well as the other operational amplifiers 164, 165, and 182 are of the single supply type that cannot produce an output signal below ground.

The output K1 (Es1-E) is applied to a lead-lag filter 156 comprised of resistors R8 and R9 and capacitor C3. The lead-lag filter 156 prevents oscillation or uncontrolled performance by controlling the damping ratio of the loop control that is effected via the operational amplifier 154 by setting the ratio of the impedance values of the resistors R8 and R9. The time constant of the filter 156 is set by selecting the capacitance of capacitor C3. The filter output is applied via resistor R10 to a voltage to frequency (V-F) converter 158 that outputs a voltage signal fsa of a frequency portional to the voltage level input thereto with a linearity in the order of 0.02 percent. The frequency of the converter output is proportional to the spark advance angle $\theta a$ and is applied via an enabled AND gate 160 to the C.S. position counter 136 for a period of time set by the monostable multi-vibrator (MV) 162 whose output is applied to an input of the AND gate 160. Thus, the AND gate 160 is enabled to permit the converter output fsa to be applied via the gate 160 to advance the preset count proportional to the voltage (Es'-E), which value has been scaled such that the maximum voltage level of the signal fsa corresponds to the maximum spark advance angle $\theta a$.

As shown in FIG. 4A, the idle speed advance control as imparted by the operational amplifier 154 and the lead-lag filter 156 is effected only at idling speed, i.e. those low or idling engine speeds as illustrated in FIG. 4a could be in the order of 600 RPM or lower, when the value of K1(Es-E) is not zero. The slope of the idle advance curve is -K1 such that for increasing RPM, the value of K1(Es-E) decreases to retard the spark advance angle $\theta a$. Thus for those idle speeds less than 600 RPM the spark advance angle $\theta a$ is advanced, and as the engine RPM increases, the spark advance angle $\theta a$ is retarded thus tending to decrease engine speed. The advantage of the use of the idle advance control is significant in that the levels of pollution emission may be significantly reduced during warm-up periods, while at the same time, decreasing the F/A ratio. Noting that over one half of the total pollutants are output during the initial, warm-up period of the engine, it is realized the significant pollutants reduction that may be achieved with this invention.

Further as shown shown in FIG. 2, the manifold vacuum is measured by the sensor 184 to provide an output signal Emv inversely proportional to the load placed upon the engine 112. As will become apparent from the following description, the output of Emv of the sensor 184 is used by the ignition control system 100 to retard the spark advance angle $\theta a$ with increasing engine loads to prevent detonation of the mixture within the cylinder. To retard the spark advance angle $\theta a$, the load control must be set to advance the spark advance angle $\theta a$ when the engine 112 is placed under no load, i.e. a high engine vacuum is sensed by the sensor 184. Thus, it is first necessary to compensate or offset for the initial high values of the output signal Emv that occur under high vacuum conditions, i.e. no load. The output Emv is applied via a resistor R16 to the positive input of the operational amplifier 164, whereas the output K1(Es1-E) is applied to the negative input of the operational amplifier 164 thus providing an output signal Emv-K1(Es1-E). As explained above, the value k1(Es-E) is a function of negative slope going to zero at engine speeds above, for example, 1000 RPM and, as such, is applied via a scaling resistor R14 to the operational amplifier 164 to cancel out the high values of Emv derived from the manifold vacuum sensor 184 at idle speeds. In particular, the impedance of the resistor R14 is scaled to achieve this result. Noting that the operational amplifier 164 is of the single supply type, the output of the operational amplifier 164 remains at zero until engine speed exceeds 1000 RPM and thereafter serves, as shown in FIG. 4B to advance the spark advance angle $\theta a$ as a function of engine speed, thus tending to increase engine speed. As shown in FIG. 2, the output Emv-K1(Es1-E) is applied via resistor R11 to the V-F converter 158 to be summed with the idle advance signal to provide the output fsa to be set in the CS position counter 136.

In FIG. 1, a speed counter 44 is disclosed to provide a digital indication of speed, whereby values of the spark advance angle $\theta a$ may be accessed in the look-up table of ROM 46. An analog version of an engine speed spark advance control is shown in FIG. 2, wherein the output E of the duty cycle integrator 150 is applied via a resistor R21 to the positive terminal of the operational amplifier 165, whereas a selected reference voltage Es3 is applied via resistor R19 to the negative terminal of the operational amplifier 165; the voltage Es3 is derived from the mid-point of a voltage divider comprised of resistors R18 and R32. The operational amplifier 165 develops an output K3(E-Es3). As illustrated in FIG. 4C, the output of the single supply type operational amplifier 165 remains zero until the engine 112 has accelerated to speeds in excess of idle speeds, e.g. 1000 RPM; thereafter, the speed advance function is in accordance with a positive slope K3, which is achieved by selecting the appropriate impedance for a feedback resistor R31 of the operational amplifier 165. It is desired to limit, as shown in FIG. 4C, the maximum advance that may be accomplished as a function of engine speed; this is accomplished by the incorporation of diode or Zener diode D8 as coupled to the output of the operational amplifier 165, thereby preventing disruptions of engine timing. It is contemplated that the speed function advance control could be configured to advance at a second, different slope by the incorporation of a further operational amplifier (not shown), whereby the spark advance angle $\theta a$ may be controlled at a different slope after the maximum value imposed by the operational amplifier 165 is realized.

Each of the voltage dividers as employed to set the reference voltages as applied to each of the operational amplifiers 154, 164, and 165 may be replaced by a potentiometer that would permit these corresponding functions to be field adjustable. For example, if a potentiometer were to be inserted in place of the voltage divider formed by the resistors R18 and R32, the point on the RPM abscissa as shown in FIG. 4C from which the speed function advance curve rises, may be set manually. On the other hand, if a potentiometer were disposed in series with the feedback resistors R20, the slope of the output K3(E-Es3) could be manually changed to permit adjustable spark timing advance rate. Similarly, potentiometers could be employed with the operational amplifier 154 to variably adjust the idle speed, or in the manifold vacuum circuit to change the slope of the vacuum retard curve as a function of load as may be required for turbo cars, high performance or even high altitude operation.

As further illustrated in FIG. 2, the cylinder pressure sensor 166 is employed to measure cylinder pressure to provide an adjustment of the spark advance angle $\theta a$ as a function of the difference between the desired peak pressure angle and a measured value of the actual peak pressure angle so that the spark advance signal fsa may be adjusted so that the engine 112 may impart the optimum means torque to its crankshaft. Typically, the peak pressure occurs within the cylinder at a point in time after the TDC position. As shown in FIG. 2, a scaled voltage Es4 is applied across resistor R30 and through the input resistor R29 to the negative terminal of an operational amplifier 182, whereas an analog signal indicative of that angle after the top dead center (ATDC) position is applied via input resistor R28 to the positive input of the operational amplifier 182 to provide a peak pressure correction as applied via resistor R13 to the V-F converter 158, whereby a peak pressure adjusted signal fsa may be loaded into the CS position counter 136.

The cylinder pressure sensor 156 need not be accurate in that only the occurrence of peak pressure within a revolution of the crankshaft, i.e. its angular position with respect to the TDC position, is significant. A piezoelectric sensor disposed under a spark plug of the engine 112 is adequate; the output of the cylinder pressure sensor 166 is applied to a differentiating circuit comprised of an operational amplifier 168, resistors R22, R23, R24, and R26, to provide a pulse output at a point in time corresponding to the angular position at which peak pressure occurs within the engine cylinder. The peak pulse output of the operational amplifier 168 is applied to a low pass filter comprised of capacitor C4 and resistor R27, the values of which are set to achieve a time constant in the order of 20 times the frequency of the first train of pulses 1XPP provided by the disc position sensor 113. Thus, only a single cylinder pressure sensor 166 needs to be employed, in that the low pass filter 169 prevents any substantial change of the measurement of peak pressure for at least four engines cycles.

The output of the low pass filter 169 is amplified by the pulse amplifier 170 before resetting a latch 172. The CS position counter 136 times out to provide an output applied to the reset input R of the latch 132, thereby disposing high its $\overline{Q}$ output, which is applied to the an input of the AND gate 174. On the occurrence of the next 8XPP pulse as derived from the input position sensor 117, the AND gate 174 is enable to drive its output high and setting the latch 172, whereby a positive pulse is applied to the b input of an AND gate 176 for a period ending when the latch 172 is reset in response to the next pulse input indicative of the occurrence of peak pressure. Thus, the AND gate 176 is enabled at a point in time corresponding to the TDC position to apply the output fvco of the PLL 122 via the enabled AND gate 176 to be counted by a peak pressure counter 178. The peak pressure counter 178 counts the pulses of the signal fvco for that angular period between TDC position and the position ATDC at which the peak pressure occurs. The digital signal as developed by the counter 178 is applied to a digital/analog (D/A) converter 180, illustratively comprised of a resistance ladder, which outputs an analog signal E$\theta$pp via a filter comprised of resistor R32 and capacitor C5 (what function) and an input resistor R28 to the positive input of the operational amplifier 182. The operational amplifier 182 develops an error voltage E$\theta$pe indicative of the difference or error between the actual peak pressure angle and the desired peak pressure angle. This error angle signal E$\theta$pe is applied via resistor R13 to the summing point of the V-F converter 178 to provide a peak pressure correction of the spark advance angle $\theta a$. The correction provided by the error signal E$\theta$pe factors in considerations of engine wear, humidity, temperature, octane rating of gas, and other factors and is effective at high engine speeds and sustained engine load to effect correction. A diode D7 is connected to the output of the operational amplifier 182 to limit the correction to a maximum value of pulse or minus $3\frac{1}{2}°$ (illustratively) of spark adjustment.

In a still further aspect of this invention as shown in FIG. 2, the dwell angle, i.e. that period of time or angular rotation of the engine crankshaft that the power is removed from an ignition coil 188 electrically coupled to the armature of the distributor 115, is electronical determined. The period of the dwell angle is illustrated in FIG. 3H as beginning at the TDC position and extending for an angle of from 45° to 90° ATDC (45° ATDC is illustrated in FIG. 3H). As shown in FIG. 2, the output of the CS position counter 136 is applied to set a dwell latch 184, whereby its $\overline{Q}$ output goes low (not necessarily at TDC?) to turn off a power amplifier illustratively taking the form of a MOSFET amplifier or a bypolar transistor, which serves to apply the battery voltage to the primary winding of the ignition coil 188. The Q output of the dwell latch 184 is applied to a b input of an AND gate 190, thereby enabling the AND gate 190 to apply the output fvco of the PLL 122 to a dwell counter 192 until it counts out to reset the dwell latch 184, whereby its $\overline{Q}$ output goes low thus disabling the AND gate 190. The dwell angle corresponding to the period tD, as shown in FIG. 3H, is controlled by the 8, 9 or 10 bit word preset in the dwell counter 192 to be in the range of 45° to 90° ATDC.

Referring now to FIG. 7, there is shown a further embodiment of this invention similar to that of the electronic ignition control system 10 as shown in FIG. 1, in which like elements are identified with like numerals but in the 200 series. As explained above, one of the normal errors associated with a closed loop system is that presented by noise and, in particular, by that noise imposed upon the high frequency speed signal derived from the sensor 217 as shown in FIG. 7. Noise is present upon the high speed signal due to the difficulty of manufacturing an encoder 218 with portions 218-1 to 218-36 that are precisely evenly spaced from each other. It is apparent that the production of a decoder disc 218 to provide precise spacings between the portion would be expensive. In the embodiment of FIG. 7, the low frequency signal is applied by the sensor 213 to the PLL 222 and, in particular, to the digital phase comparator 224. In a manner similar to that described above, the digital phase comparator 224 provides an output error signal to a first lead-lag filter 252, whose output is applied by the resistor R39 by the VCO 228. In a manner similar to that described above, the VCO output fvco is applied to be counted by the CS position counter 236 to thereby provide an output pulse indicative of the timing instant. The VCO output is also applied to the divide by N counter 230 which is scaled with a value of $N=2^{10}$, such that the output of the VCO will fill the CS counter 236 during the revolution of the crankshaft through an arc of 45°, as explained above. It is apparent that the resolution of the encoder disc 216 that provides a relatively low frequency pulse is significantly less than that with which the encoder disc 218 must be produced.

The sensor 217 produces a high frequency speed signal that is applied to a monostable vibrator MV 250 whose output is limited by a Zener diode 254 and filtered by a second simple filter 256. The filter output is in turn summed by a resistor R38 an applied to the vco 228. The MV 250 and the filter 256 form a duty cycle integrator to provide an analog output signal that is proportional to crankshaft rotation. The time constant of the second filter 256 is set to reduce the ripple as would be applied to the output signal of the sensor 217 to approximately 0.05%. In particular, the first filter 252 has a time constant at least eight times that of the second filter 256. The second filter 256 operates on a data rate of 160 cycles per second for an engine speed of 600 RPM. In order to reduce the ripple by 5 octaves or to 0.1%, it would be necessary to provide a time constant of 10 cycles per second for the second filter 256. The performance of the duty cycle integrator comprised of the MV 250 and the filter 256 suffers from the open-loop type problem, i.e. its gain will change due to aging whereby the output will vary proportionally. The deficiencies of the duty cycle integrator are compensated for by the closed loop operation of the PLL 222 wherein at the leading edge of the output of the divider by in counter 230 is compared with the output of the sensor 217. The error corrects for non-linearities of the vco 228 and also for long or short periods that would be expected to occur in the open loop operation of the duty cycle integrator. The advantages of the electronic ignition control system 200 as shown in FIG. 7 resides in the flexibility of its operation and the ease with which essential components, e.g. the encoder disc 118, may be manufactured. First, the output of the digital phase comparator 224 reflects the errors or non-linearities of the vco 228 and the other elements of the PLL 22, as opposed to the perturbation errors associated with cylinder firing. Thus, the capacitor C6 of the filter 254 may be selected without regard to memory requirements as imposed upon the capacitor C1 of the filter 26 of the embodiment shown in FIG. 1. Secondly, the data rate of the output of the sensor 213 may be readily increase, e.g. to 16 times that of the output of the sensor 217, which imposed a noise upon the signal being feed into the PLL 22 of the embodiment of FIG. 1. In the electronic ignition control system 200 the space of the portions 218-1 to 218-36 need not be especially precise but only regular enough to cause its sensor 217 to go on and off. As a result, the cost of manufacturing the encoder disc 218 is significantly reduced.

A comparison of the electronic ignition control systems of FIGS. 1 and 7 will illustrate the advantage of the system 10 primarily in terms of the increase gain that may be achieved with the PLL 22. A primary factor in determining the gain of the PLL 22 is the gain derived from its digital phase comparator 24. In the embodiment of FIG. 1, the input data rate to the digital phase comparator 24 is 16 times that applied to the digital phase comparator 224. As a result, the output from the digital phase comparator as measured in terms of volts per degree error is greater and, as a result, the entire PLL 22 has a greater gain. In addition, the filter 26 can be $\frac{1}{8}$ the value of the time constant of the filter 252, as a result, the resistance of the resistor R1 as seen in FIG. 1 can be set at a lower value, whereby the gain of the vco 28 is made effectively higher. As described above, it is also noted that the scaling factors of the divide by N counters 30 and 230 are respectively set at 1024 and 128, with the corresponding increase of gain, as explained above. Thus, it is believed that the PLL 22 as described in FIG. 1 that operates upon a relatively high data input as derived from its sensor 17 is preferred in that it permits the use of a filter with the lowest possible filter time constant while permitting the highest gain of its loop control.

Figure 10:
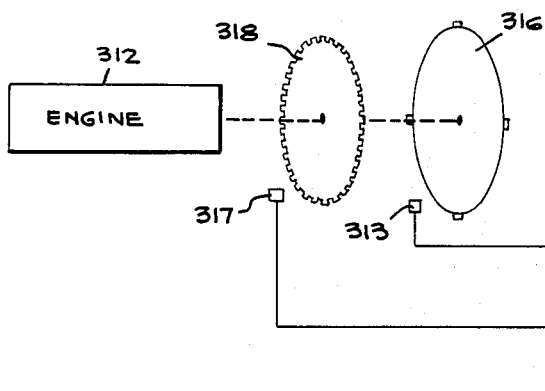
FIG. 10 is a functional block diagram of a modification of a prior art control circuit in accordance with the teachings of this invention.

Referring now to FIG. 10, there is shown a still further embodiment of this invention, wherein a microprocessor implemented ignition control system as represented in FIG. 9 by the numeral 360 and as described above under the heading description of the prior art is modified in accordance with the teachings of this invention. The elements of the system as shown in FIG. 9, are similar to those of the electronic ignition control system 10 as shown in FIG. 1, but numbered in the 300 series. As described above, the microprocessor 360 employs a crystal oscillator to produce a train of accurate clock pulses that are gated to a counter, one train of such pulses for each revolution of the engine crankshaft or distributor. The value as counted in the counter provides a indication of the crankshaft speed fs and, as detailed above, is inaccurate in it takes into account the speed of a whole revolution of the crankshaft, whereas the crankshaft may accelerate or decelerate within the period of a single revolution thereof. Thus in accordance with the teachings of this invention, two encoder discs 316 and 318 are rotatably coupled to the engine 312. First sensor 313 applied a relatively low frequency pulse train, each pulse occurring at that point at which the crankshaft moves past a point 45° BTDC, whereas a second sensor 313 provides a second train of higher frequency pulses to the PLL 324 which provides an output fvco from its vco that is accurately proportional to the instantaneous speed of rotation of the crankshaft of the engine 312. In the prior art, the output of the sensor 312 was used to the gate the output of a crystal oscillator into a counter for a prescribed period; the counted value is divided into one to obtain an indication of speed, i.e. the average speed of the last revolution of the crankshaft. Instead in accordance with the teachings of this invention, the microprocessor 360 employs the output of the sensor 313 to gate the signal fvco into a counter, which count is used to address a ROM (not shown in FIG. 9) to obtain an advance/retard angle in a manner as described above. The address ROM value is then transferred to a counter to be counted down to derive a spark timing signal in a manner similar to that described above with respect to FIG. 1.

It is contemplated within the teachings of this invention that various signals as appear within the ignition control systems 10 of FIG. 1 and 100 of FIG. 2 may be used to define the abnormal operation of the engine, i.e. roughness of engine timing and accelerations imposed upon the engine. For example, the output signal of the digital phase comparator 24 as shown in FIG. 1 is the sum of the average speed set in and the filtered error signal at the output of the filter 26; this signal may be differentiated and used to set the richness or F/A mixture to achieve smooth running. Further, the output of the filter 26 may be used as a lock circuit comprised illustratively of two exclusive NOR gates and used to prevent the output of the CS position counter 36 from being applied to the distributor 15 until the phase lock loop is "locked" as when starting the car.

It is further contemplated that an accelerometer be placed on the engine 12 that outputs a signal proportional to engine knock that results when the engine detonates and retards the spark signal proportionally. For example, the accelerometer output is biased to subtract the normal noise and is applied to the negative terminal of the operational amplifier 164 associated with the manifold vacuum sensor 182 or to the negative terminal of the operational amplifier 154 associated with the duty cycle integrator 150, as shown in FIG. 2.

Thus, it is seen that the output signal fsa as derived from the voltage to frequency converter 158 provides an adaptive control to advance or retard the spark instant for a variety of environmental conditions, as well as accounting for engine wear. Though the circuits and methods are described above as relating primarily to a gasoline fired engine, it is also apparent that these circuits and methods are equally applicable to diesel engines for injection angle control and governor control.

In considering this invention, it should be remembered that the present disclosure is illustrative only and the scope of the invention should be determined by the appended claims.

I claim:

1. An electronic ignition system for controlling as a function of a selected engine parameter the ignition instant of an internal combustion engine having at least one cylinder and a piston disposed therein and coupled to a rotatable crankshaft of the engine to define a first reference position with respect to the crankshaft, the ignition instant occurring upon the termination of an arc of crankshaft rotation at a second variable position with respect to said first reference position, the arc of crankshaft rotation being initiated at a third reference position fixedly disposed before said first reference position considering the rotational direction of the crankshaft, said electronic ignition system comprising:
   (a) means responsive to crankshaft rotation for providing a first train of signals of a first frequency, each first signal occurring in time when the crankshaft rotates past its third reference position;
   (b) means responsive to crankshaft rotation for providing a second train of signals of a second frequency greater than said first frequency and proportional to the speed of angular rotation of the crankshaft, said second frequency being such that consecutive signals of said second train define a first angle of crankshaft rotation;
   (c) multiplying means coupled to receive said second train of signals for providing a third train of signals of a third frequency greater than said second frequency, said third frequency being such that consecutive signals of said third train define a second angle of crankshaft rotation smaller than said first angle;
   (d) means coupled to receive said first and third trains of signals and actuated upon the occurrence of each signal of said first train for integrating said third train of signals to obtain an indication of the present crankshaft position with respect to said first reference position and said third reference position with a high degree of resolution corresponding to said second, relatively small angle; and
   (e) means responsive to the selected parameter for setting said second variable position.

2. The electronic ignition system as claimed in claim 1, wherein said setting means comprises means for applying said set second variable position to said integrating means to permit a comparison thereof with said indication of crankshaft position, so that when said indication of present crank position matches said second variable position engine ignition occurs at the ignition instant.

3. The electronic ignition system as claimed in claim 2, wherein there is included switch means for applying the output of said setting means at the ignition instant to effect cylinder firing, counter means responsive to the occurrence of the ignition instant for initiating the counting of said third train of signals to a preset count, whereby said switch means disconnects said setting means for a predetermined period from the engine.

4. The electronic ignition system as claimed in claim 2, wherein said integrating means comprises a counter coupled to said sitting means to receive said set first variable position and for integrating said first train of signals to obtain an output count to be compared with said set second variable position.

5. The electronic ignition system as claimed in claim 4, wherein said setting means includes means for loading prior to the occurrence of said third reference position a count corresponding to said second variable position into said counter, for counting said loaded count in response to said third train of signals and for effecting engine ignition when said output count equals a predetermined count.

6. The electronic ignition system as claimed in claim 5, wherein said setting means comprises means responsive to said third train of signals for providing an indication of speed.

7. The electronic ignition system as claimed in claim 6, wherein said setting means comprises means responsive to said indication of speed as the selected engine parameter for setting said second variable position.

8. The electronic ignition system as claimed in claim 7, wherein said setting means comprises a second counter for counting said third train of signals to provide said indication of the rotational speed of the crankshaft.

9. The electronic ignition system as claimed in claim 8, wherein said setting means comprises a memory for storing a plurality of values of said second variable position empirically determined for a particular engine to achieve a maximum mean torque output from the engine for a corresponding value of crankshaft speed.

10. The electronic ignition system as claimed in claim 9, wherein said setting means comprises means responsive to said indication of crankshaft speed for accessing a corresponding value of said second variable position within said memory and for loading said accessed value of said second variable position into said first mentioned counter.

11. The electronic ignition system as claimed in claim 1, wherein wherein there is further included filter means coupled to receive said second train of signals and having a damping ratio set to average out rotational speed perturbations as appear within said second train of signals as would occur during a signal revolution of the crankshaft due to cylinder firings.

12. The electronic ignition system as claimed in claim 11, wherein said multiplying means comprises oscillator means responsive to a filtered output of said filter means for providing said third train of signals of said second frequency proportional to the magnitude of said filtered output.

13. The electronic ignition system as claimed in claim 12, wherein there is further included a comparator for comparing the phase of said second train of signals with the phase of said third train of signals for providing and applying an error signal indicative of the difference therebetween to said filter means.

14. The electronic ignition system as claimed in claim 13, wherein said setting means further comprises means for integrating said third train of signals to provide and apply an indication of the rotational speed of the crankshaft as the selected operating parameter to said function generating means.

15. The electronic ignition system as claimed in claim 14, wherein said function generating means generates an output for retarding said second variable position with respect to said third referenced position as a function proportional to increasing crankshaft speed.

16. The electronic ignition system as claimed in claim 15, wherein said controlling means comprises means responsive to said output of said generating means for providing and applying an output signal of a frequency proportional thereto to said integrating means to set said second variable position.

17. The electronic ignition system as claimed in claim 16, wherein there is included means coupled to the engine for measuring the load imposed upon its crankshaft and for providing a load output signal as a further engine parameter, and said setting means comprises second generating means responsive to the load output to provide a load advance output indicative of said second variable position.

18. The electronic ignition system as claimed in claim 17, wherein said second function generating means is also coupled to receive said retarding output of said first mentioned function generating means and for subtracting said retarding output from said load output to provide said load advance output.

19. The electronic ignition system as claimed in claim 14, wherein said setting means comprises function generating means responsive to the selected engine parameter for setting said second variable position.

20. The electronic ignition system as claimed in claim 19, wherein there is further included means associated with the engine for sensing cylinder pressure and for providing an output indicative of the occurrence of peak pressure within the engine's cylinder, means responsive to the peak pressure output for measuring the angular crankshaft rotation between said third reference position and the occurrence of peak pressure and for providing an angular displacement signal indicative thereof, and third generating means responsive to said angular displacement signal for providing a pressure advance signal of corresponding magnitude.

21. An electronic ignition system for controlling as a function of a selected engine parameter the ignition instant of an internal combustion engine having at least one cylinder and a piston disposed therein and coupled to a rotatable shaft of the engine to define a first reference position with respect to the crankshaft, the ignition instant occurring upon the termination of an arc of crankshaft rotation at a second variable position with respect to said first reference position, the arc of crankshaft rotation being initiated at a third reference position fixedly disposed before said first reference position considering the rotational direction of the crankshaft, said electronic ignition system comprising:
(a) means responsive to crankshaft rotation for providing a first train of signals of a first frequency, each signal occurring in time when the crankshaft rotates past its third reference position;
(b) means responsive to crankshaft rotation for providing a second train of signals of a second frequency greater than said first frequency and proportional to the speed of angular rotation of the crankshaft;
(c) closed loop circuit means comprising comparison means coupled to receive said second train of signals for providing an error signal, oscillator means for providing a corrected, third train of signals of a third frequency greater than said second frequency and proportional to the magnitude of said error signal, and feedback means for coupling said third train of signals to said comparison means, whereby said comparison means provides said error signal as a function of the phase difference between the signals of said first and third trains of signals; and
(d) counter means coupled to receive said first and third trains of signals and actuated upon the occurrence of each signal of said first train for incrementing a preset count indicative of the ignition instant for each signal of said third train, whereby upon the incrementing of said preset count to a predetermined magnitude, said counter means outputs a firing signal at the ignition instant.

22. The electronic ignition system as claimed in claim 21, wherein said feedback means comprises divider means for dividing said third train of signals by a factor to apply a fourth divided train of signals to said comparison means.

23. The electronic ignition system as claimed in claim 22, wherein said counter means has a given capacity, the second frequency being such that consecutive signals of said second train define a given angle of rotation of the crankshaft, said third frequency being set such that the number of signals of said third train occurring in the course of the arc of crankshaft rotation equals said given capacity of said counter means, and said factor being selected such that consecutive pulses of said fourth, divided train also define said given angle of crankshaft rotation.

24. The electronic ignition system as claimed in claim 21, wherein said closed loop circuit means comprises filter means for receiving said error signal and for applying a filtered signal to said oscillator means.

25. The electronic ignition system as claimed in claim 24, wherein said filter means has a time constant set to average out rotational speed perturbations as occur during a single revolution of the crankshaft due to cylinder firings.

26. The electronic ignition system as claimed in claim 21, wherein there is included means responsive to the selected parameter for setting said preset count in said counter means as indicative of said second variable position.

27. The electronic ignition system as claimed in claim 26, wherein the selected parameter is the rotational speed of the engine crankshaft and said setting means comprises second counter means for counting said third train of signals for a predetermined period of time to provide an accurate indication of the rotational speed of the engine crankshaft.

28. The electronic ignition system as claimed in claim 27, wherein said setting means further comprises a memory for storing a plurality of said preset counts empirically determined for a particular engine to achieve a maximum mean torque output from the engine for a corresponding value of crankshaft speed and accessing means responsive to said indication of crankshaft speed for accessing a corresponding preset count and for loading said accessed count into said first mentioned counter.

29. An electronic ignition system for controlling the ignition instant of an internal combustion engine as a function of the rotational speed of the engine crankshaft, the internal combustion engine having at least one cylinder and a piston disposed therein and coupled to the crankshaft to define a first reference position with respect to the crankshaft, the ignition instant occurring upon the termination of an arc of crankshaft rotation at a second variable position with respect to said first reference position, the arc of crankshaft rotation being initiated at a third reference position fixedly disposed before said first reference position considering the rotational direction of the crankshaft, said electronic ignition system comprising:
(a) means responsive to crankshaft rotation for providing a first train of signals of a first frequency, each signal occurring in time when the crankshaft rotates past its third reference position;
(b) means responsive to crankshaft rotation for providing a second train of signals of a second frequency greater that said first frequency and proportional to the rotational speed of the crankshaft;
(c) first counter means coupled to receive the first and second trains of signals and actuated upon the occurrence of each signal of said first train for incrementing a preentered count upon the occurrence of each signal of said second train, whereby when said preentered count is counted to a predetermined magnitude said first counting means outputs at the ignition instant a cylinder firing signal;
(d) second counter means for counting said second train of signals for a predetermined interval to provide a count indicative of the rotational speed of the crankshaft; and
(e) addressable memory means for storing a plurality of said preentered counts, each preentered count corresponding to a value of said first variable position empirically determined for a particular engine to achieve a maximum mean torque output from the engine for a corresponding value of the rotational speed of the crankshaft, said addressable memory means being addressed by the count of said second counter means to access and load the addressed preentered count corresponding to said second variable position into said first counter means.

30. The electronic ignition system as claimed in claim 29, wherein there is included first switch means responsive to the occurrence of said cylinder firing signal for applying said second train of signals for said predetermined interval to said second counter means.

31. The electronic ignition system as claimed in claim 30, wherein there is further included second switch means responsive to the termination of the said predetermined interval for effecting the loading of the addressed preentered count from said memory means into said first counter means.

32. An electronic ignition system for controlling as a function of a selected engine parameter, the ignition instant of an internal combustion engine having at least one cylinder, and a piston disposed therein and coupled to a rotatable crankshaft of the engine to define a first reference position with respect to the crankshaft, the ignition instant occurring upon the termination of an arc of crankshaft rotation at a second variable position with respect to said first reference position, the arc of crankshaft rotation being initiated at a third reference position fixedly disposed before said first reference position considering the rotational direction of the crankshaft, said electronic ignition system comprising;
(a) means responsive to the crankshaft rotation for providing a first train of signals of a first frequency, each signal occurring in time when the crankshaft rotates past its third reference position;
(b) means responsive to crankshaft rotation for providing a second train of signals of a second frequency greater than said first frequency and proportional to the rotational speed of the crankshaft;
(c) integrator means for intergrating said second train of signals to provide a signal indicative of the rotational speed of the crankshaft; and
(d) a closed loop circuit means comprising comparison means coupled to receive said first train of signals for providing an error signal, oscillator means coupled to receive said error signal and to said crankshaft speed signal for providing a corrected, third train of signals of a frequency proportional to the rotational speed of the crankshaft, and feedback means for coupling said output signal to said comparison means whereby said comparison means provides said error signal as the phase difference of the signals of the first and third train of signals.

33. The electronic ignition system as claimed in claim 32, wherein there is included means coupled to receive said first and third trains of signals and actuated upon the occurrence of each signal of said first train for incrementing a preset count indicative of the ignition instant for each signal of said third train, whereby upon the incrementing of said preset count to a predetermined magnitude, said counter means outputs a firing signal at the ignition instant.

34. The electronic ignition system as claimed in claim 33, wherein said feedback means comprises divider means for dividing said third train of signals by a factor to apply a fourth divided train of signals to said comparison means.

35. The electronic ignition system as claimed in claim 34, wherein said counter means has a given capacity, the second frequency being such that consecutive signals of said second train define a given angle of rotation of the crankshaft, said third frequency being set such that the number of signals of said third train occurring in the course of the arc of crankshaft rotation equals said given capacity of said counter means, and said factor being selected such that consecutive pulses of said fourth, divided train also define said given angle of crankshaft rotation.

36. The electronic ignition system as claimed in claim 32, wherein said closed loop circuit means comprises filter means for receiving said error signal and for applying a filtered signal to said oscillator means.

37. The electronic ignition system as claimed in claim 36, wherein said filter means has a time constant set to average out rotational speed perturbations as occur during a single revolution of the crankshaft due to cylinder firings.

38. The electronic ignition system as claimed in claim 32, wherein there is included means responsive to the selected parameter for setting said preset count in said counter means as indicative of said second variable position.

39. The electronic ignition system as claimed in claim 38, wherein the selected parameter is the rotational speed of the engine crankshaft and said setting means comprises second counter means for counting said third train of signals for a predetermined period of time to provide an accurate indication of the rotational speed of the engine crankshaft.

40. The electronic ignition system as claimed in claim 39, wherein said setting means further comprises a memory for storing a plurality of said preset counts each count empirically determined for a particular engine to achieve a maximum mean torque output from the engine for a corresponding value of crankshaft speed and accessing means responsive to said indication of crankshaft speed for accessing a corresponding preset count and for loading said accessed count into said first mentioned counter.

41. An electronic ignition system for controlling with a high degree of resolution the ignition instant of an internal combustion engine as a function of a selected engine parameter, said internal combustion engine having at least one cylinder, a piston disposed within the cylinder, and a rotatable crankshaft coupled to the piston to be rotatably driven as combustions occur within the cylinder, the crankshaft having at least one reference position defining the positional relationship of said crankshaft to the cylinder, the crankshaft having a second reference position disposed a fixed angular distance before said first reference position considering the rotational direction of the crankshaft, said ignition instant intended to occur upon the termination of a variable crankshaft arc beginning at said second reference position, said crankshaft arc determined as a function of the selected engine parameter, said electronic ignition system comprising:

(a) rotor means coupled to rotate with the crankshaft and having at least one first reference indicium and a plurality of second reference indicia thereon for each first reference indicium, said first reference indicium positionally related to said second reference position, said second reference indicia being spaced from each other by substantially equal first angles of crankshaft rotation;

(b) first and second signal generating means disposed at a point fixed in relation to the rotation of the crankshaft for providing respectively a first train of signals and a second train of signals of a second frequency, each first signal occurring in time when said first reference indicium rotates past said fixed point, each second signal occurring in time when each of said second reference indicia rotates past said fixed point;

(c) multiplying means coupled to receive said second train of signals for providing a third train of signals of a third frequency greater than said second frequency, said third frequency being such that consecutive signals of said third train define second angles of crankshaft rotation smaller than said first angles; and (d) arc termination means initiated in response to said first signal for measuring said variable crankshaft arc in response to said third train of signals to produce an ignition signal when said measured crankshaft arc equals the variable crankshaft arc set as a function of said selected engine parameter with a degree of resolution corresponding to said relatively small second angles.

42. The electronic ignition system as claimed in claim 41, wherein there is further included filter means coupled to receive said second train of signals and having a damping ratio set to average out rotational speed perturbations as appear within said second train of signals as would occur during a single revolution of the crankshaft due to cylinder firings.

43. The electronic ignition system as claimed in claim 42, wherein said multiplying means comprises oscillator means responsive to a filtered output signal of said filter means for providing said third train of signals of said third frequency proportional to the magnitude of said filtered output signal.

44. The electronic ignition system as claimed in claim 43, wherein there is further included a comparator for comparing the phase of said second train of signals with the phase of said third train of signals for providing and applying an error signal indicative of the difference therebetween to said filter means.

45. The electronic ignition system as claimed in claim 44, wherein said oscillator means establishes said third frequency as a multiple N of said second frequency, and there is further included divider means coupled to said oscillator means for dividing said third train of signals by a quotient N to provide said error signal to said comparator.

46. The electronic ignition system as claimed in claim 41, wherein said rotor means comprises a disk bearing said plurality of second reference indicia in the form of slots disposed therein and spaced from each other in accordance with said first angles, and said second signal generating means comprises a source for directing radiation through said plurality of slots and means responsive to radiation directed through said slots for providing said second train of signals.

47. The electronic ignition system as claimed in claim 41, wherein said arc termination means comprises integrating means for receiving said first and third train of signals and actuated upon the occurrence of each signal of said first train for integrating said third train of signals to provide an indication of the present crankshaft position with respect to said first reference position with a degree of resolution corresponding to said second, relatively small angles.

* * * * *